US012346883B2

(12) United States Patent
Soni

(10) Patent No.: US 12,346,883 B2
(45) Date of Patent: *Jul. 1, 2025

(54) CATEGORIZED TIME DESIGNATION ON CALENDARS

(71) Applicant: Microsoft Technology Licensing, LLC, Redmond, WA (US)

(72) Inventor: Shahil Soni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/083,172

(22) Filed: Dec. 16, 2022

(65) Prior Publication Data

US 2023/0121667 A1     Apr. 20, 2023

Related U.S. Application Data

(63) Continuation of application No. 15/420,906, filed on Jan. 31, 2017, now Pat. No. 11,599,857.

(51) Int. Cl.
*G06Q 10/00* (2023.01)
*G06F 7/00* (2006.01)
*G06F 7/08* (2006.01)
*G06Q 10/1093* (2023.01)

(52) U.S. Cl.
CPC ........... *G06Q 10/1095* (2013.01); *G06F 7/08* (2013.01); *G06Q 10/1093* (2013.01)

(58) Field of Classification Search
CPC ................. G06Q 10/1095; G06Q 10/1093
See application file for complete search history.

(56) References Cited

U.S. PATENT DOCUMENTS

2007/0250366 A1* 10/2007 Nurmi ................ G06Q 10/1095
                                                            705/7.19
2009/0125817 A1*  5/2009 O'Sullivan .......... G06Q 10/109
                                                            715/753
2016/0292650 A1* 10/2016 Smith, III .......... G06Q 10/1095

FOREIGN PATENT DOCUMENTS

CN      101369324 A      2/2009
CN      101686571 A      3/2010
CN      104885022 A      9/2015

OTHER PUBLICATIONS

Method for Automated, Intelligent Calendar Management via User Profile Collaboration. Jun. 20, 2012 IP.com (Year: 2012).*

(Continued)

*Primary Examiner* — Matheus Ribeiro Stivaletti

(57) ABSTRACT

Technologies are described for categorization of time blocks in calendars. A time block to be categorized on a user's calendar may be determined based on a direct user input or inference from user history or behavior. Next, a category to be assigned, a beginning, and an end for the time block may be determined. The time block may be the same on all work days, different on each day, etc. One or more exceptions to be processed during the categorized time block may also be determined through direct user input or inference. Then, one or more rules associated with the assigned category restricting scheduling of events on the user's calendar during the categorized time block may be implemented subject to the one or more exceptions.

20 Claims, 11 Drawing Sheets

(56) References Cited

OTHER PUBLICATIONS

"Notice of Allowance Issued in China Patent Application No. 201880009512.0", Mailed Date: May 2, 2023, 5 Pages.
"Office Action and Search Report Issued in Chinese Patent Application No. 201880009512.0", Mailed Date: Dec. 2, 2022, 16 Pages.

* cited by examiner

CATEGORIZED TIME DESIGNATION ON CALENDARS

CROSS-REFERENCE TO RELATED APPLICATIONS

This application is a continuation of and claims priority to U.S. patent application Ser. No. 15/420,906, filed Jan. 31, 2017, entitled "CATEGORIZED TIME DESIGNATION ON CALENDARS", which is hereby incorporated by reference herein in its entireties. To the extent appropriate, the present application claims priority to the above-referenced application.

BACKGROUND

There are many software tools to assist people with their busy days and tasks. Calendar applications are one of those tools allowing people to schedule events such as meetings, tasks, appointments, etc. Modern calendar applications are typically much more than a scheduling tool and provide a wide variety of functionality and features. The essence of calendar applications is still based on same concepts. For example, a user indicates they want to create an event, the user provides all details of the event, and the event is created and displayed on a calendar with textual presentation such as title and timing of the event.

In an increasingly busy work and personal environment, people's calendars are usually filled with meetings, appointments, and similar events. Furthermore, increased collaborative features and access allow others to schedule meetings and other events easily resulting in diminished control of a person over his or her own daily schedule. Time slots in a person's schedule may be double booked and meetings may be scattered at various times, which may become disruptive for the person when trying to complete tasks.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing categorization of time blocks in calendars. In some examples, a time block to be categorized on a user's calendar may be determined based on a direct user input or inference from user history or behavior. Next, a category to be assigned, a beginning, and an end for the time block may be determined. The time block may be the same on all work days, different on each day, etc. One or more exceptions to be processed during the categorized time block may also be determined through direct user input or inference. Then, one or more rules associated with the assigned category restricting scheduling of events on the user's calendar during the categorized time block may be implemented subject to the one or more exceptions.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
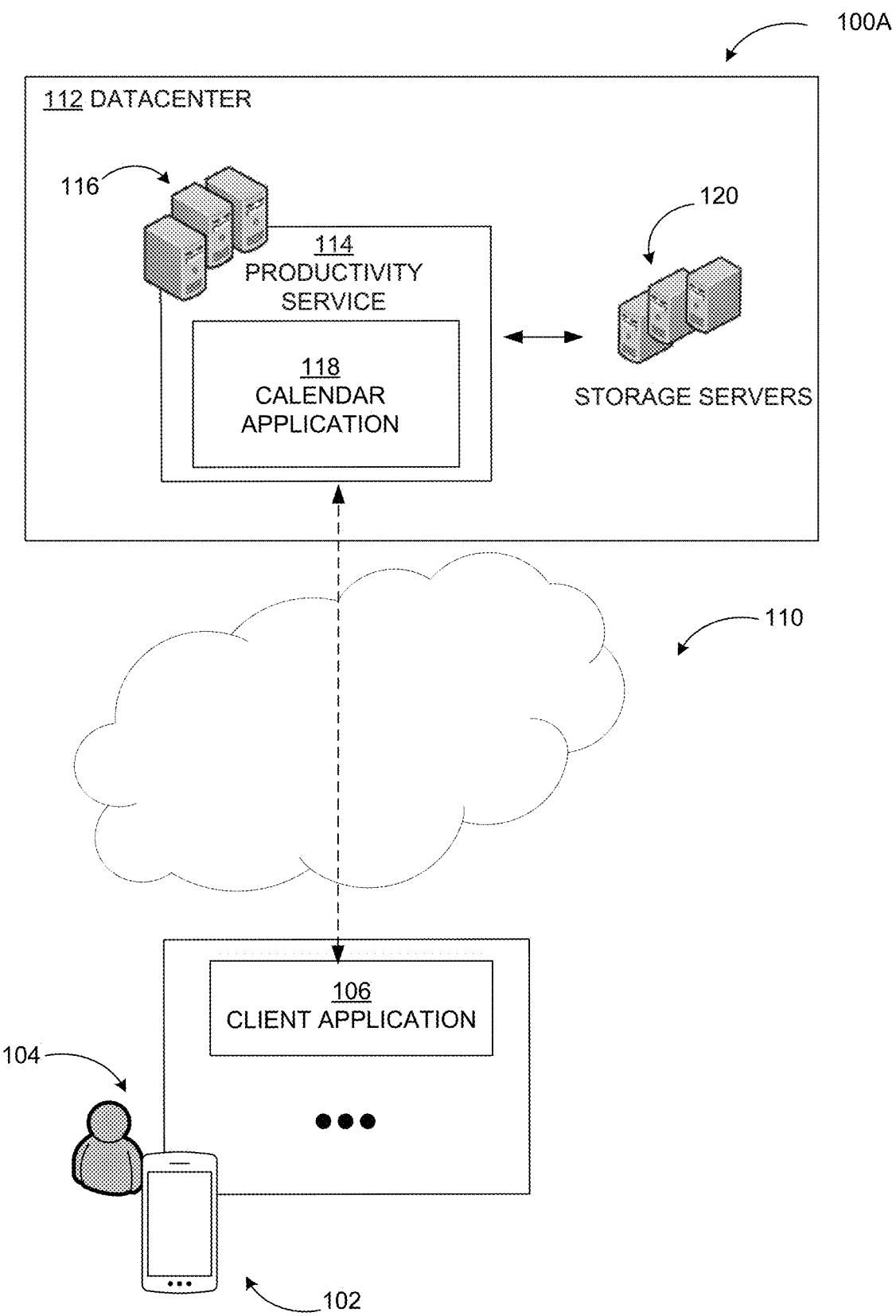
FIGS. 1A-1C include display diagrams illustrating example network environments where categorization of time blocks in calendars may be implemented.

As briefly described above, embodiments are directed to categorization of time blocks in calendars. A user may indicate a designation for a selected time block to be categorized or a system may analyze the user's history and behavior to infer a category to be assigned to a time block on the user's calendar. The beginning and end of the time block for each day of the week or over several days may be determined along with the category to be assigned based on user input or inference. Various categories may be provided as default categories with others to be defined by the user. Each category may be associated with one or more rules that restrict scheduling of events such as meetings, appointments, and others during the categorized time block. Exceptions may also be defined based on user input or inference. For example, certain people may be allowed to schedule events during a categorized time block, when others are not allowed. In another example, category designations may be exposed to other users and event requests that match a category may be allowed during the time block.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a time block to be categorized on a user's calendar may be determined based on a direct user input or inference from user history or behavior. Next, a category to be assigned, a beginning, and an end for the time block may be determined. The time block may be the same on all work days, different on each day, etc. One or more exceptions to be processed during the categorized time block may also be determined through direct user input or inference. Then, one or more rules associated with the assigned category restricting scheduling of events on the user's calendar during the categorized time block may be implemented subject to the one or more exceptions. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
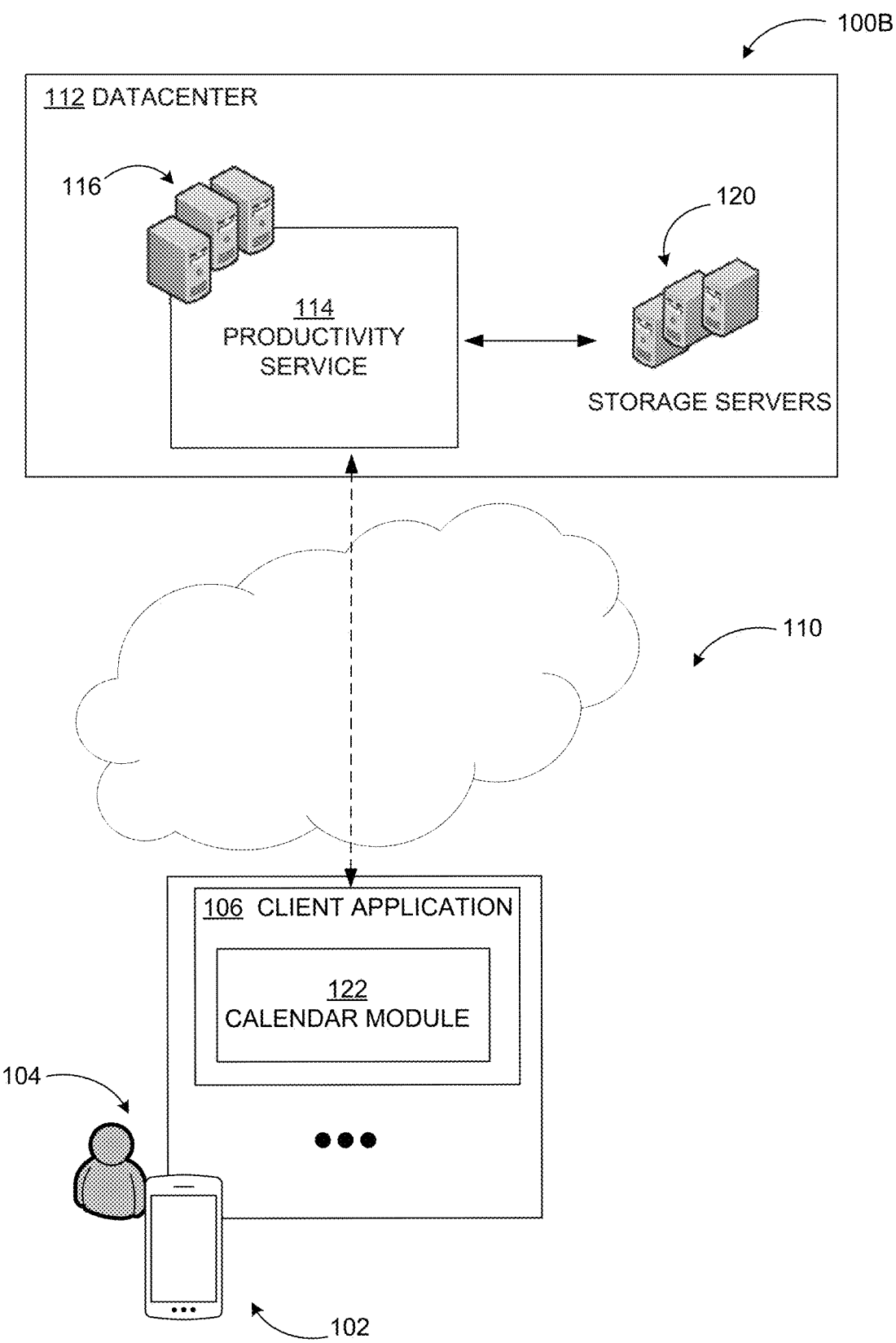
Figure 1C:
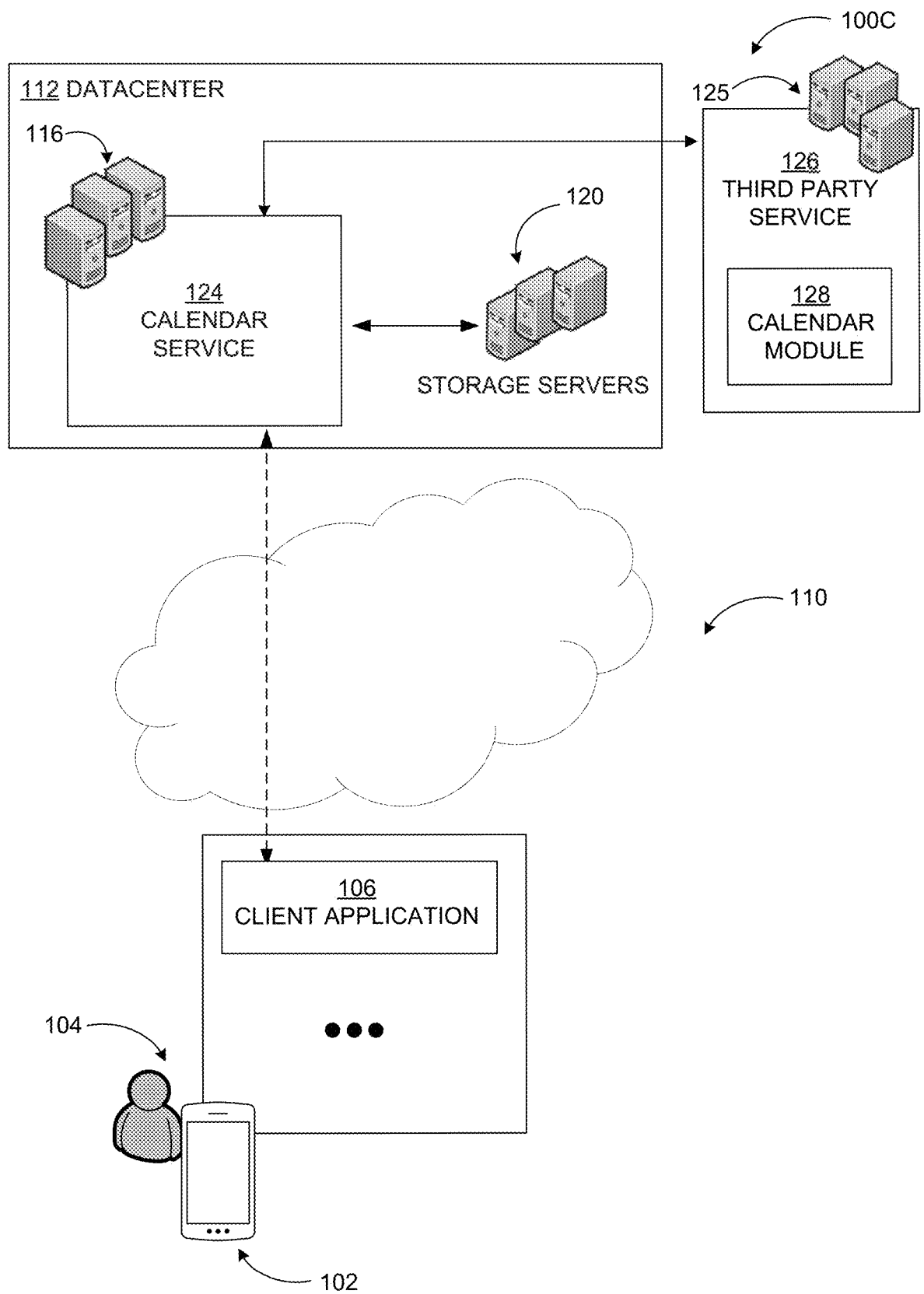

FIGS. 1A-1C include display diagrams illustrating example network environments where categorization of time blocks in calendars may be implemented. As illustrated in diagrams 100A-C, an example system may include a datacenter 112 hosting a cloud-based productivity service 114 configured to enable users to create, edit, and/or share content among multiple devices and across a variety of platforms. The datacenter 112 may include one or more processing servers 116 configured to execute the productivity service 114, among other components. The datacenter 112 may also include one or more storage servers 120 configured to manage one or more data stores comprising data associated with the productivity service 114. As described herein, the productivity service 114 may be implemented as software, hardware, or combinations thereof.

In some embodiments, the productivity service 114 may be configured to interoperate with various applications. For example, as illustrated in the diagrams 100A-C, a user 104 may execute a thin (e.g., a web browser) or a thick (e.g., a locally installed client application) version of an application 106 through a device 102 with which the productivity service 114 may be configured to integrate and interoperate with over one or more networks, such as network 110. The application 106 may be an application hosted by the productivity service 114. The application 106 may be configured to provide specific services such as scheduling, calendar management, task management, and similar ones. As such, the application 106 may be a communication application or a calendar application, among other examples, and communicate with a component of the productivity service 114 such as calendar application 118. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In one embodiment, as illustrated in diagram 100A, at least one of the processing servers 116 may be operable to execute a calendar application 118 of the productivity service 114, where the calendar application 118 may be integrated with the productivity service 114. In another embodiment, as illustrated in diagram 100B, the application 106 may be operable to execute a calendar module 122, where the calendar module 122 may be integrated with the application 106.

Diagram 100C of FIG. 1C illustrates yet another example configuration, where a calendar service 124 is executed by the servers 116 at the datacenter 112. The time block categorization according to embodiments may be performed by the calendar service 124 in conjunction with the client application 106. The calendar service 124 may communicate with one or more third party services 126 executed on servers 125 to enable scheduling of events on users' calendars across different systems. The third party services 126 may include respective calendar modules 128.

Some of the actions and/or processes described herein have been illustrated from the perspective of a server (for example, the processing servers 116 configured to execute the productivity service 114), however similar actions may be performed similarly by a client (for example, the application 106), among other entities.

Technical advantages of categorization of time blocks in calendars based on rules and exceptions for scheduling events may include improved performance, reduced processing and network bandwidth usage, and improved user interaction, as well as enhanced communal productivity and efficiency.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with calendar and scheduling activities through services hosted across a variety of platforms and devices.

Figure 2:
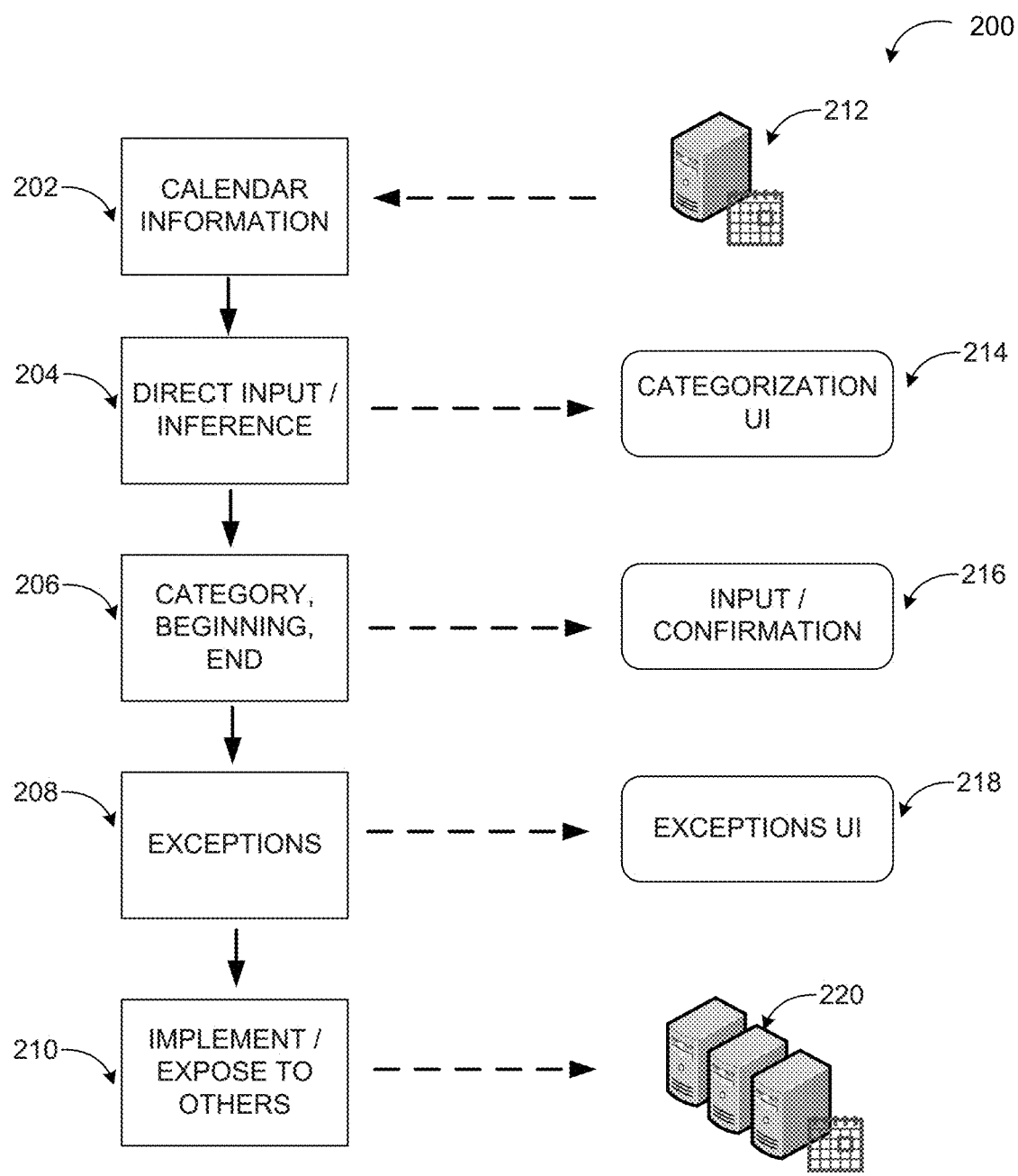
FIG. 2 includes a display diagram illustrating an example scheme to categorize time blocks in calendars.

FIG. 2 includes a display diagram illustrating an example scheme to categorize time blocks in calendars.

According to embodiments, a time block to be categorized on a user's calendar may be determined based on a direct user input or inference from user history or behavior. Next, a category to be assigned, a beginning, and an end for the time block may be determined. The time block may be the same on all work days, different on each day, etc. One or more exceptions to be processed during the categorized time block may also be determined through direct user input or inference. Then, one or more rules associated with the assigned category restricting scheduling of events on the user's calendar during the categorized time block may be implemented subject to the one or more exceptions.

To determine the time block on the user's calendar to be categorized, a calendar application may analyze one or more of a current schedule of the user, a scheduling history of the user, and a user behavior in conjunction with the user's calendar, and render the inference based on the analysis. The calendar application may also analyze a communication associated with the user.

The rules may define rejection of an event scheduling request from another user during the time block subject to the one or more exceptions. The rules may also define allowing an event scheduling request from another user during the time block if the requested event is of the same category as the time block.

Exceptions to be processed during the time block may also be determined based on direct user input or inference. The inference may be based on analysis of one or more of a current schedule of the user, a scheduling history of the user, and a user behavior in conjunction with the user's calendar. The exceptions may be based on a person requesting to schedule an event during the time block or a category assigned to the time block in some examples. For example, a user's supervisor may be allowed to schedule meetings during the focus time block for the user while others may not be. If categories are exposed to other users and meeting or appointments are associated with similar attributes, an event having the same attribute as the category for a time block may be allowed during that time block. For example, a meeting request for a meeting associated with a project may be allowed during a time block designated by the user as dedicated to that project. In yet other examples, the exceptions may be based on user allowed double booking. For example, the categorized time block may be treated as a scheduled event and exposed as busy time. However, the user may allow double booking of meetings during the time block. In one scenario, the double booking may be based on percentage. The user may define what percentage of the time block can be double booked. Thus, the first few event requests may be accepted until the percentage threshold is reached. After that point, no new event scheduling requests may be allowed during the categorized time block.

The time block may be selected or determined (based on inference) with same beginning and end on each of the workdays, week days, or all days. It may also be selected or determined with distinct beginning and end on different days. In some embodiments, the time block may be determined based on one or more existing events to surround the events. For example, if there is a calendar event for a presentation, the time slots before the presentation may be automatically categorized as "focus" time blocks to allow the user time to prepare for the presentation without interruption by other meetings or appointments.

Categorized time blocks may be exposed to other users (within the same hosted service as the user or outside the hosted service) as busy time. In other embodiments, the category information may also be exposed allowing other users to avoid requesting meetings or appointments during the time block. The exposure of the category information may also allow users within a group (e.g., a project team) to synchronize their categories optimizing communal calendars. In further embodiments, categorization of time blocks (categories, beginnings and ends of the time blocks, exceptions, etc.) may be monitored and analyzed by the system to generate reports on communal efficiency and calendar optimization. For example, if a majority of employees in an organization prefer a break time block in the afternoon, the organization may designate that time as an organization-wide break time or avoid scheduling meetings during that time.

As shown in a diagram 200, a user's calendar information 202, history of usage, and other relevant data may be retrieved from one or more sources such as a calendar service 212. The time block to be categorized may be determined based on direct user input or inference 204 using a categorization user interface 214 that may allow the user to define the time block or confirm an inferred time block to be categorized.

A suitable category to be assigned to the time block, beginning and end of the time block, and similar attributes (206) may be determined based on direct user input or inference using an input and/or confirmation user interface 216. Next, exceptions 208 to the restrictions associated with the assigned category may be determined based on direct user input or inference through an exceptions user interface 218.

The rules for restriction of event scheduling based on the assigned category and the exceptions may be implemented (210) and category information may be exposed to other users for efficient interactivity in scheduling events across different services/systems.

While a productivity service is used as an illustrative example herein, embodiments may be implemented in other service environments as well. Other services that may provide time block categorization in calendars may include, but are not limited to, scheduling services, collaborative services, communication services, and others with scheduling components. Additionally, the actions and/or processes described herein have been illustrated from the perspective of a server, however similar actions may be performed similarly by a client application, among other entities.

FIGS. 3A-3D include example calendar user interfaces illustrating categorization of time blocks in calendars.

Figure 3A:
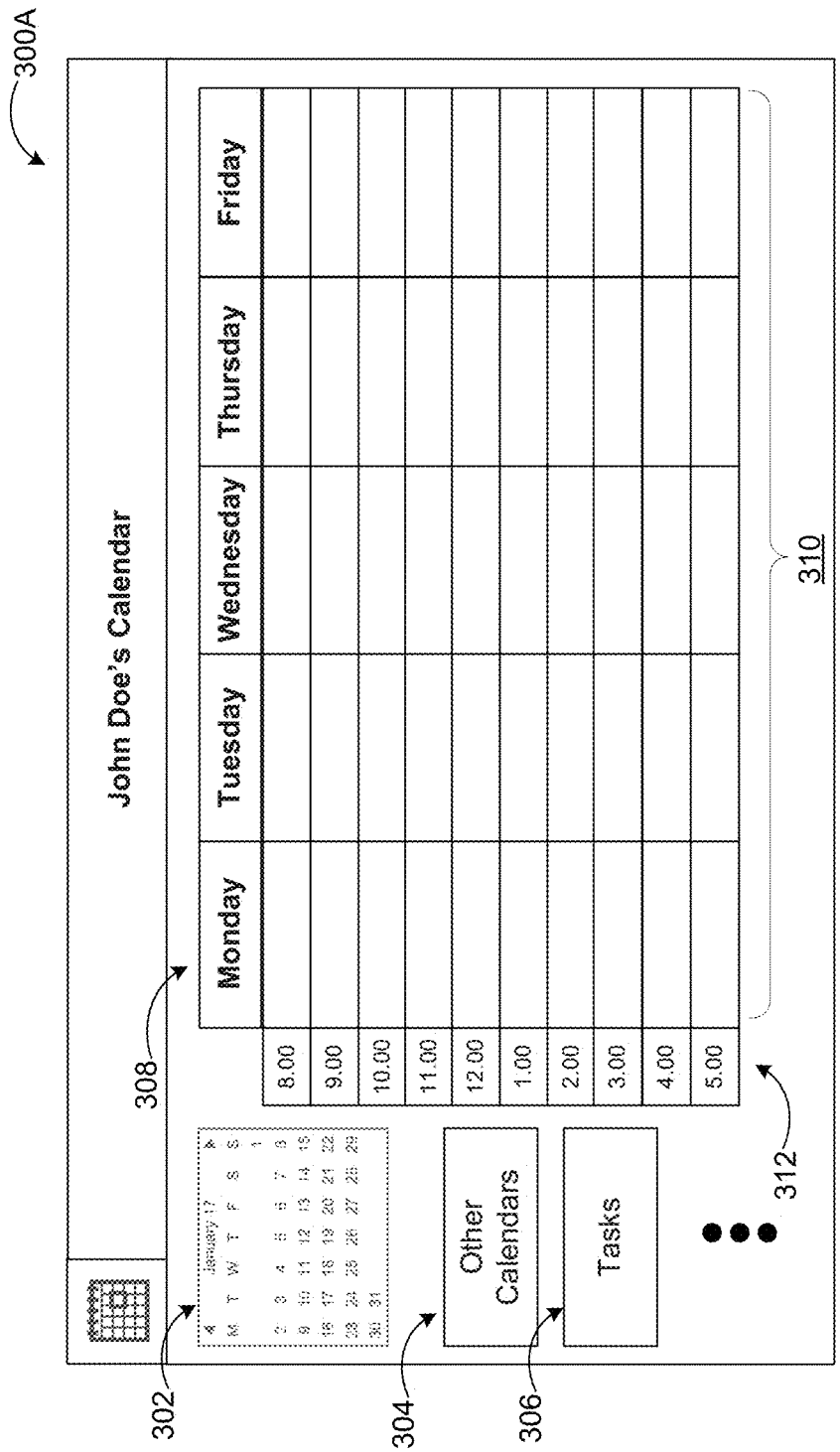
FIGS. 3A-3D include example calendar user interfaces illustrating categorization of time blocks in calendars.

Diagram 300A of FIG. 3A shows an example calendar application user interface with a weekly calendar view displaying work days. The calendar application user interface may also include summary calendar view 302, links to other calendars 304, summary view or links to tasks 306, and so on. The calendar view may have a top row listing the days 308, a first column listing the hours 312 and cells 310 corresponding to available time slots (hour and day).

In a typical user calendar, other users may send a request for scheduling an event such as a meeting or an appointment, and the requested event may show temporarily on the calendar until it is confirmed or rejected by the user (owner of the calendar). Usually, there are no restrictions for other users to send a request. Thus, the user has to manually reject an unsuitable request when it conflicts with an existing event or not desirable to the user. Embodiments are directed to categorization of time blocks on the user's calendar such that event scheduling requests may be automatically restricted based on the user's preferences. In some examples, the categorized time blocks may be exposed to other users as simply busy time. In other examples, category information may be exposed as well allowing others to understand and avoid sending a request to schedule an event during the time block or events of the same category may be treated as exceptions.

Figure 3B:
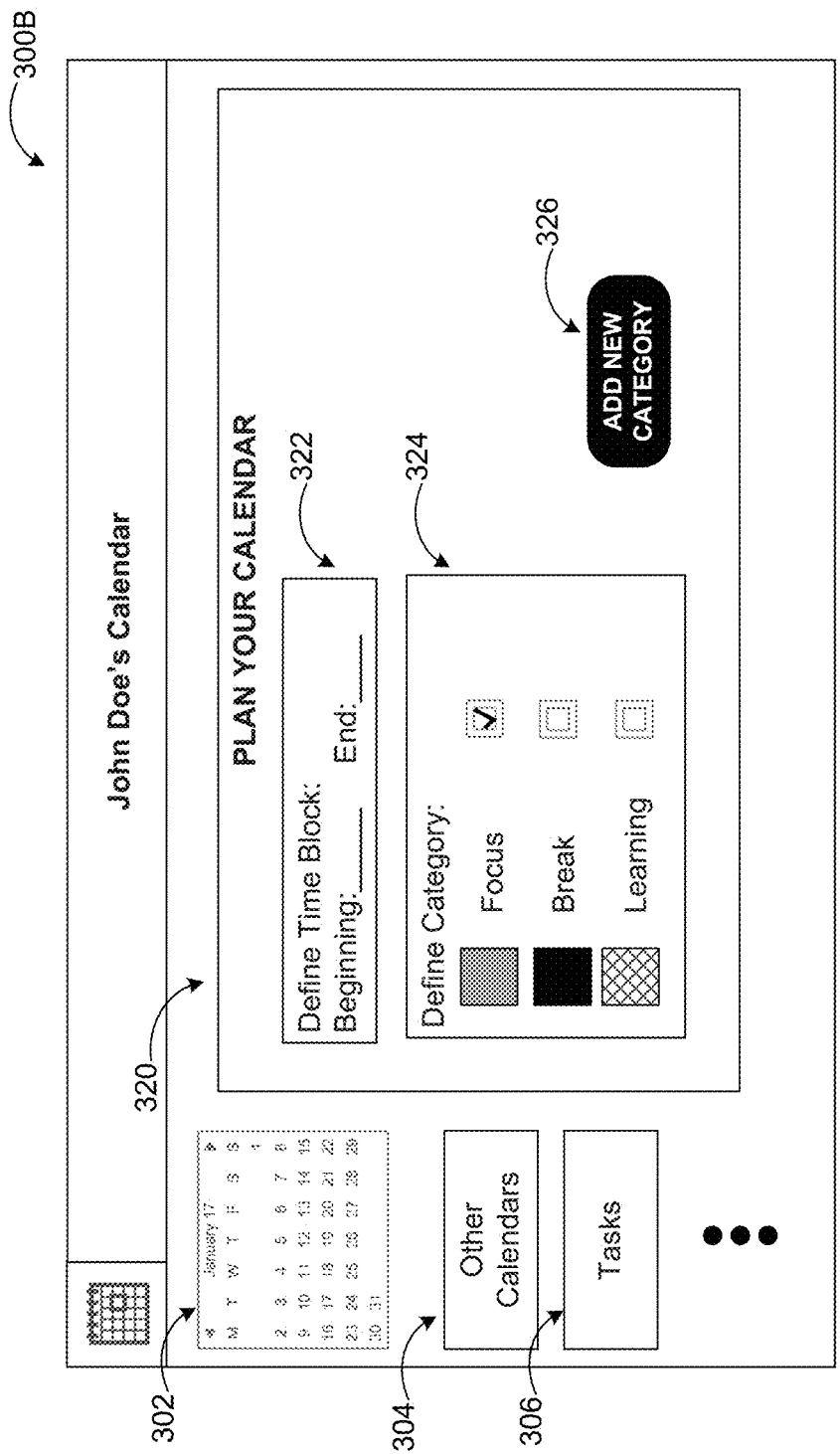

Diagram 300B of FIG. 3B shows a categorization user interface 320. The categorization user interface 320 may include an input control 322 to define a beginning and an end of a time block to be categorized for determining the time block based on direct user input. In other embodiments, the time block may be determined based on inference. The input control 322 may be a text input box, time/date selector, and similar user interface elements. The categorization user interface 320 may also include a category selection control 324, which may allow the user to select a category from a list of default categories. Users may also be allowed to define a new category (326). In other examples (not shown), users may be allowed to indicate whether the time block is to be at the same time on each day or at different times on different days. In yet other embodiments, some or all aspects of the time block(s) to be categorized may be determined based on inference using the user's history, behavior, and other information such as user's location, communications exchanged by the user (e.g. indicating a status of the user at particular days or times), and other relevant information.

Figure 3C:
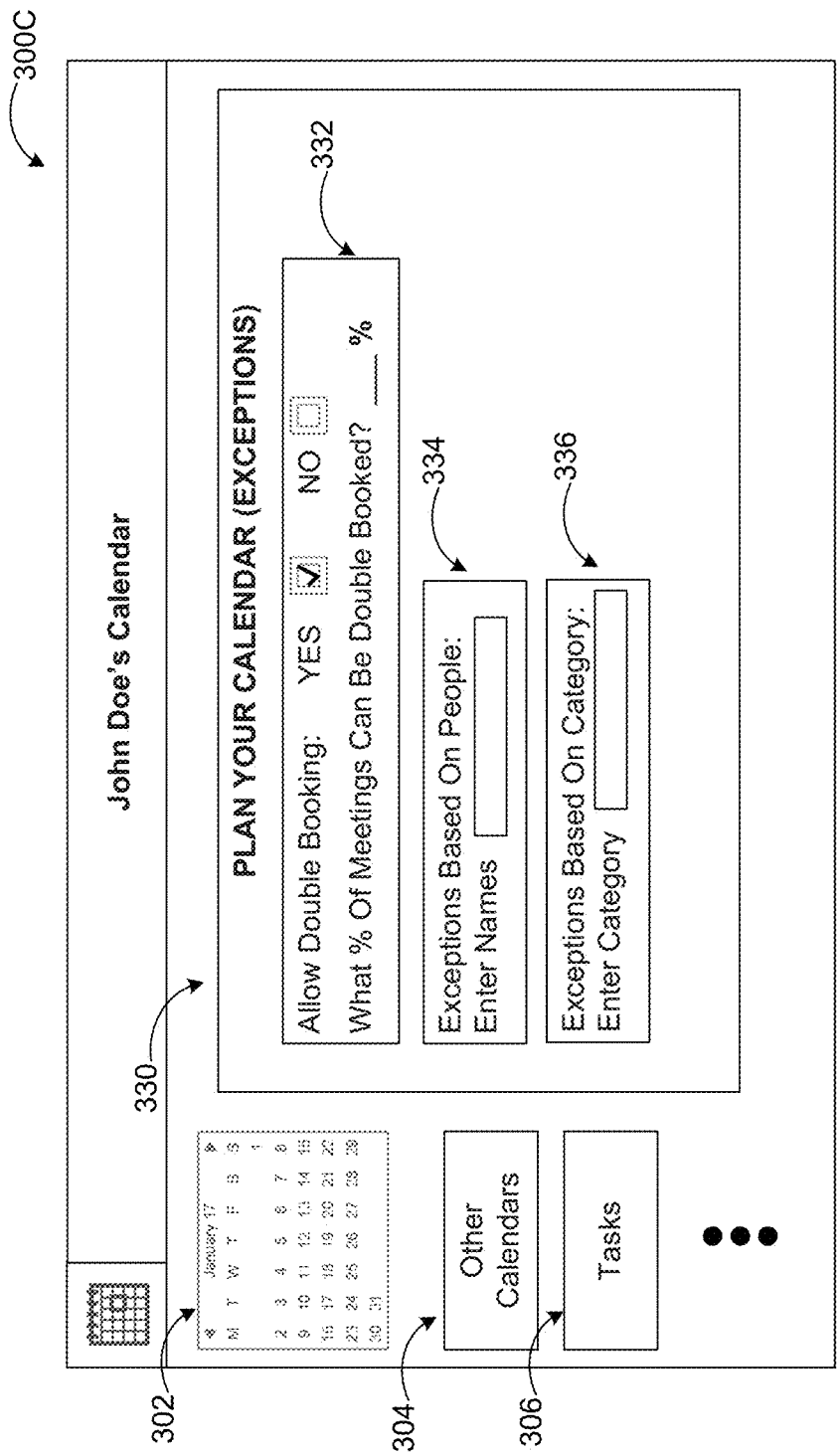

Diagram 300C of FIG. 3C shows an exceptions user interface 330 that may be displayed upon completion of time block and category selections/definitions. The exceptions may be defined by the user (or inference based exceptions confirmed) based on people (334) or based on category (336). For example, the user may designate some people to exempted from the scheduling restrictions such as supervisors, assistant, family members, etc. Similarly, specific exceptions may be defined for each category (e.g., meetings for a specific project may be allowed during a focus time block when other meetings may be restricted).

Another example of exceptions may be allowing double booking 332. Double booking refers to allowing events to be scheduled during a restricted time block, which may be exposed to other users as busy time. In some examples, the user may be allowed to select double booking or not and what percentage of the time block can be double booked. For example, the user may select 25 percent. That may mean, event scheduling requests during the time block may be allowed until 25 percent of the time block is filled with events. Then, any requests may be rejected automatically.

Figure 3D:
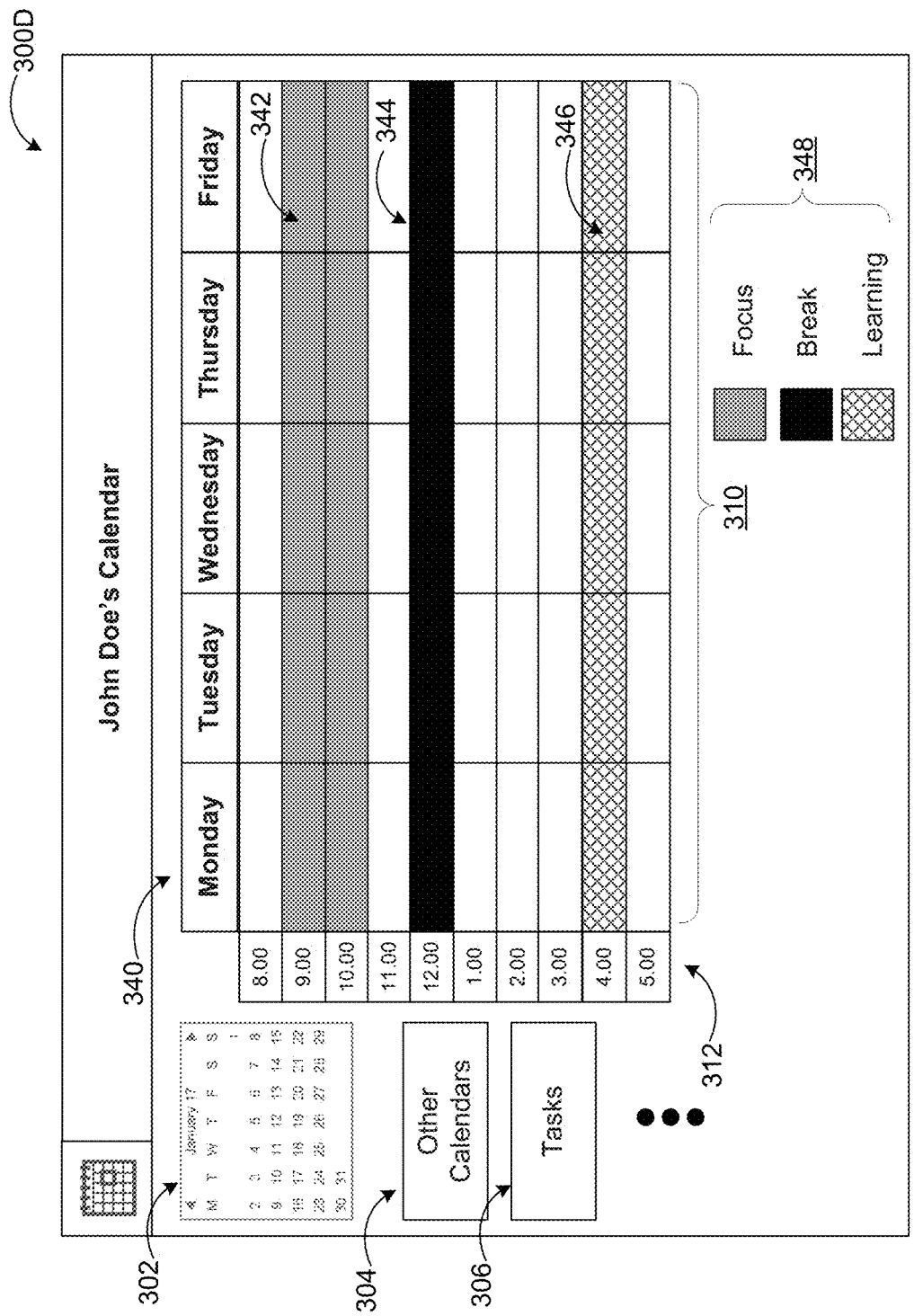

Diagram 300D of FIG. 3D shows an example calendar view 340 with categorized time blocks. In the example calendar view 340, a time block between 9.00 am and 11.00 each work day is designated as focus time 342. Another time block between 12.00 pm and 1.00 pm is designated as break time. A further time block between 4.00 pm and 5.00 pm is designated as learning time 346. A legend 348 of the categories may be displayed as well. Various color, shading, highlighting, textual, and graphic schemes may be used to enhance display and interaction with the elements of the user interfaces described herein.

The examples provided in FIG. 1A through FIG. 3D are illustrated with specific systems, services, applications, modules, and user experiences. Embodiments are not limited to environments according to these examples. Categorization of time blocks in calendars may be implemented in environments employing fewer or additional systems, services, applications, modules, and user experiences. Furthermore, the example systems, services, applications, modules, and user experiences shown in FIG. 1A through FIG. 3D may be implemented in a similar manner with other values using the principles described herein.

Figure 4:
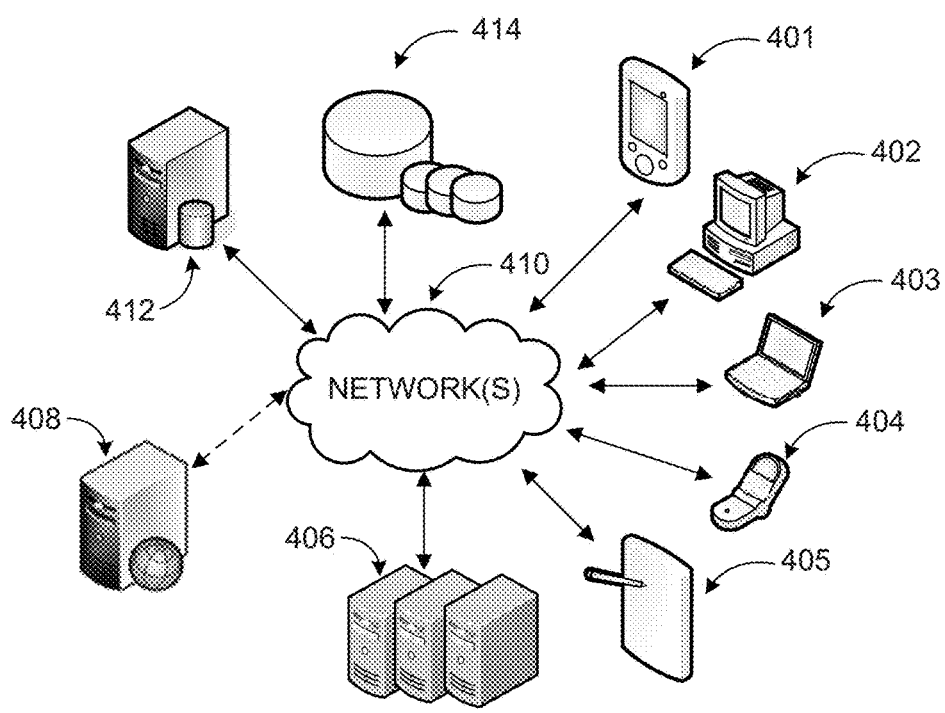
FIG. 4 is an example networked environment, arranged in accordance with at least some embodiments described herein.

FIG. 4 is an example networked environment, arranged in accordance with at least some embodiments described herein.

In addition to locally installed applications (for example, application 106), a calendar may also be employed in conjunction with hosted applications and services (for example, a productivity service 114) that may be implemented via software executed over one or more servers 406 or individual server 408, as illustrated in diagram 400. A hosted service or application may communicate with client applications on individual computing devices such as a handheld computer 401, a desktop computer 402, a laptop computer 403, a smart phone 404, a tablet computer (or slate), 404 (client devices') through network(s) 410 and control a user interface presented to users.

Client devices 401-404 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, engines, and modules may be employed to provide categorization of time blocks in calendars. Furthermore, the networked environments discussed in FIG. 4 are for illustration purposes only. Embodiments are not limited to the example services, applications, engines, modules or processes.

Figure 5:
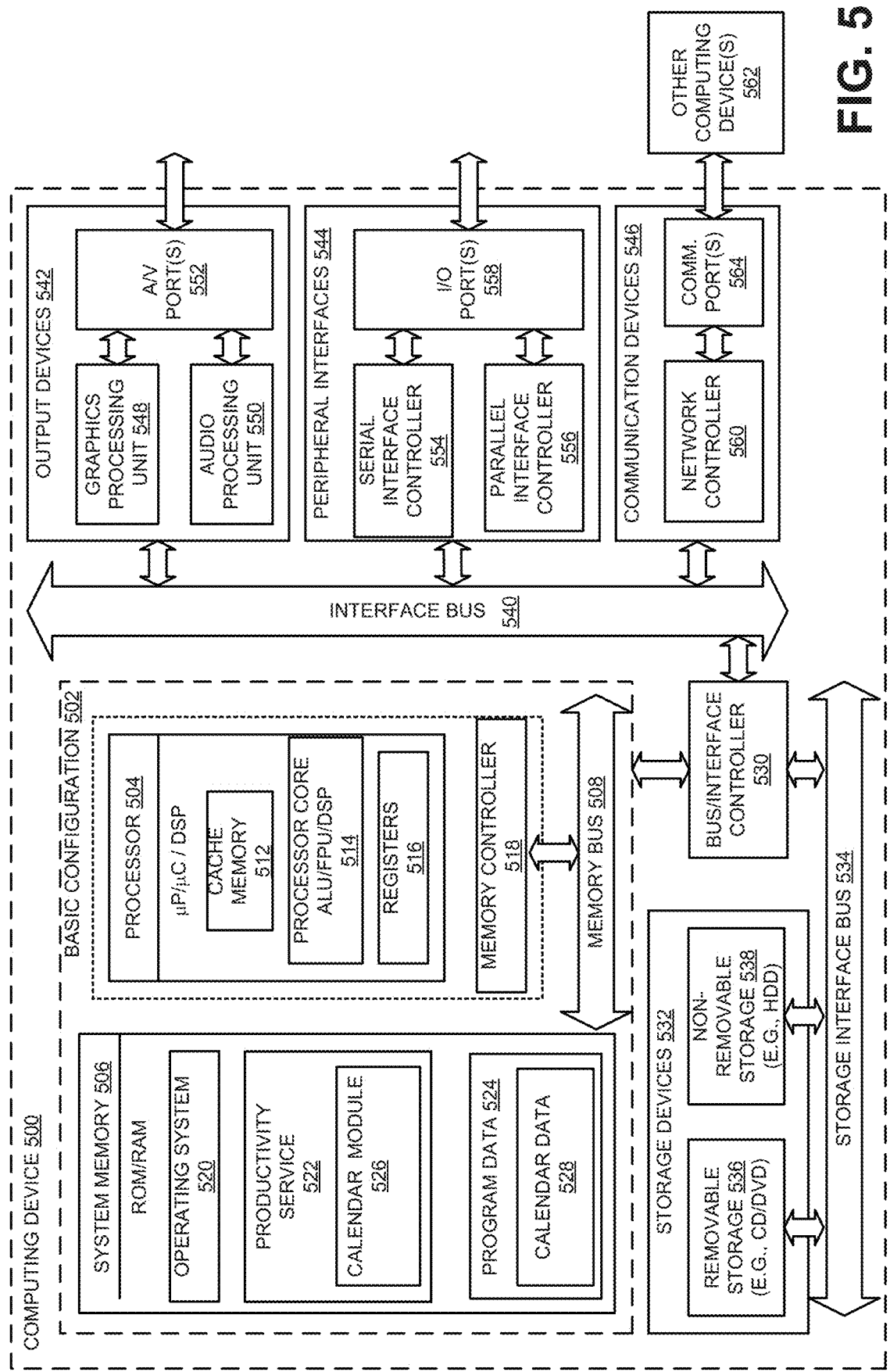
FIG. 5 illustrates a general purpose computing device, which may be configured to provide categorization of time blocks in calendars, arranged in accordance with at least some embodiments described herein.

FIG. 5 illustrates a general purpose computing device, which may be configured to provide categorization of time blocks in calendars, arranged in accordance with at least some embodiments described herein.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a productivity service 522, and program data 524. The productivity service 522 may include a calendar module 526, which may be an integrated module of the productivity service 522. In other embodiments, the calendar module 526 may be an integrated module of a locally installed application of the productivity service 522 or the calendar module 526 may be a separate module associated with a third party service configured to serve multiple applications of the productivity service 522. The calendar module 526 may be configured to categorize a time block on a user's calendar based on a direct user input or inference from user history or behavior. A beginning and an end for the time block may be determined. The time block may be the same on all work days, different on each day, etc. One or more exceptions to be processed during the categorized time block may also be determined through direct user input or inference. Then, one or more rules associated with the assigned category restricting scheduling of events on the user's calendar during the categorized time block may be implemented subject to the one or more exceptions. The program data 524 may include, among other data, calendar data 528 such as meeting data, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 505, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide categorization of time blocks in calendars. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
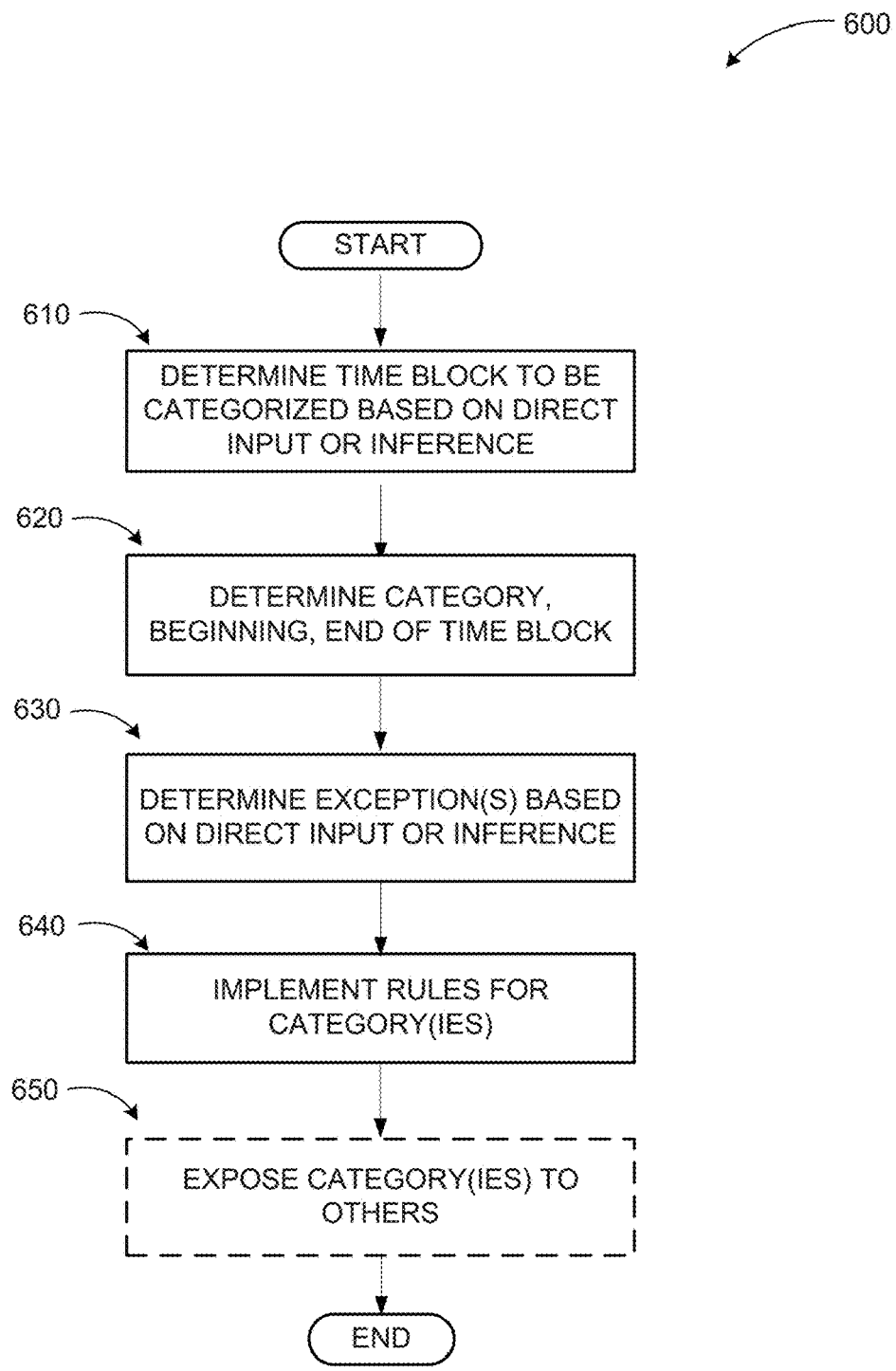
FIG. 6 illustrates a logic flow diagram for an example process to provide categorization of time blocks in calendars.

FIG. 6 illustrates a logic flow diagram for an example process to provide categorization of time blocks in calendars, arranged in accordance with at least some embodiments described herein.

Process 600 may be implemented on a computing device, server, or other system. An example system may include a communication interface configured to facilitate communication between a productivity service and an application of the productivity service, a memory configured to store instructions, and one or more processors coupled to the memory and configured to execute a calendar module, where the calendar module is configured to provide categorization of time blocks in calendars.

Process 600 begins with operation 610, where the calendar module may determine a time block to be categorized on a user's calendar based on a direct user input or inference from user history or behavior. For example, the user may activate a control to designate a categorized time block and be provided with a user interface to provide the details or user history and/or behavior may be analyzed to make an inference for a categorized time block.

At operation 620, a category to be assigned, a beginning, and an end for the time block may be determined, again based on direct user input or inference. The time block may be the same on all work days, different on each day, etc. Example categories may include focus time, learning time, break time, and similar ones. Some categories may be provided as default categories by the calendar module, others may be defined by the user.

At operation 630, one or more exceptions to be processed during the categorized time block may be determined through direct user input or inference. The exceptions may be people based, category based, or according to other criteria such as percentage based double booking. The exceptions may also be configurable or customizable by the user.

At operation 640, one or more rules associated with the assigned category may be implemented subject to the one or more exceptions. The rules may be specific to each category and restrict scheduling of events on the user's calendar during the categorized time block.

At optional operation 650, the time block may be exposed to other users (e.g., through the productivity service) as busy time or with details indicating the category.

The operations included in process 600 are for illustration purposes. Categorization of time blocks in calendars may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing categorization of time blocks in calendar is described. The means may include a means for determining a time block on a user's calendar to be categorized based on a direct user input or inference; a means for determining a category to be assigned, a beginning, and an end for the time block; a means for determining one or more exceptions to be processed during the time block; and a means for implementing one or more rules associated with the assigned category restricting scheduling of events on the user's calendar during the time block subject to the one or more exceptions.

According to some examples, a method to provide categorization of time blocks in calendar is described. The method may include determining a time block on a user's calendar to be categorized based on a direct user input or inference; determining a category to be assigned, a beginning, and an end for the time block; determining one or more exceptions to be processed during the time block and implementing one or more rules associated with the assigned category restricting scheduling of events on the user's calendar during the time block subject to the one or more exceptions.

According to other examples, determining the time block on the user's calendar to be categorized based on the inference may include analyzing one or more of a current schedule of the user, a scheduling history of the user, and a user behavior in conjunction with the user's calendar, rendering the inference based on the analysis, and analyzing a communication associated with the user.

According to further examples, implementing the one or more rules associated with the assigned category restricting the scheduling of events on the user's calendar may include rejecting an event scheduling request from another user during the time block subject to the one or more exceptions and allowing an event scheduling request from another user during the time block if the requested event is of the same category as the time block.

According to some examples, determining the category to be assigned, the beginning, and the end for the time block may include determining the category to be assigned, the beginning, and the end for the time block based on a direct input or inference and determining the beginning and the end for the time block may include selecting the time block with the same beginning and the end for each workday and selecting the time block with a different beginning and a different end for at least two or more workdays.

According to other examples, the method may also include exposing the time block to other users as busy time and exposing the time block to other users with an indication of the assigned category.

According to some examples, a computing device to provide categorization of time blocks in calendars is described. The computing device may include a communication interface configured to facilitate communication between the computing device and one or more servers and other computing devices; a memory configured to store instructions; and one or more processors coupled to the memory and the communication interface, the one or more processors configured to execute a calendar application. The calendar application may configured to determine a time block on a user's calendar to be categorized based on a direct user input or inference; determine a category to be assigned, a beginning, and an end for the time block; determine one or more exceptions to be processed during the time block; implement one or more rules associated with the assigned category restricting scheduling of events on the user's calendar during the time block subject to the one or more exceptions; and expose the time block to the one or more servers and the other computing devices as one of busy time and an indication of the assigned category.

According to some examples, the calendar application may be configured to determine the one or more exceptions to be processed during the time block based on direct user input or inference, and determine the one or more exceptions to be processed during the time block based on inference by analyzing one or more of a current schedule of the user, a scheduling history of the user, and a user behavior in conjunction with the user's calendar. The one or more exceptions may be based on one of a person requesting to schedule an event during the time block and a category assigned to the time block.

According to further examples, the calendar application may be configured to determine the category to be assigned, the beginning for the time block, the end for the time block, and the one or more exceptions based on a type of one or more existing events on the user's calendar. The category may be assigned and the one or more exceptions may be customizable and configurable by the user. The calendar application may part of a productivity service.

According to other examples, a computer-readable memory device with instructions stored thereon, which when executed by a computing device cause the computing device to provide categorization of time blocks in calendars is described. The instructions may include determining a first time block and a second time block on a user's calendar to be categorized based on a direct user input or inference; determining a category to be assigned, a beginning, and an end for each of the first time block and the second time block, wherein the first time block has a same beginning and a same end for each workday and the second time block has a different beginning and a different end for at least two or more workdays; determining one or more exceptions to be processed during each of the first time block and the second time block; implementing one or more rules associated with the assigned categories for the first time block and the second time block restricting scheduling of events on the user's calendar during the first time block and the second time block subject to the respective one or more exceptions; and exposing the first time block and the second time block to other users as one of busy time and an indication of the respective assigned categories.

According to further examples, the one or more exceptions may include permission of double booking of meetings based on a percentage of double booking selected by the user. The instruction may further include analyzing time blocks, assigned categories, and exceptions from a plurality of users within an organization; and generating a communal efficiency and productivity report based on the analysis.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to control scheduling of events within an electronic calendar of a user, the method comprising:
   receiving, with a productivity service accessible to the user, a new event to be scheduled on the electronic calendar of the user at a specified time;
   determining, with the productivity service, whether the specified time of the new event falls within a categorized time block indicative of a period of time subject to one or more restriction requirements preventing scheduling of events on the electronic calendar of the user;
   determining, with the productivity service, a category of the new event;
   comparing, with the productivity service, the category of the new event to a category of the categorized time block;
   in response to the category of the new event matching the category of the categorized time block, determining, with the productivity service, that the new event is subject to one or more exceptions to one or more restriction requirements associated with the categorized time block;
   in response to determining that the new event is subject to the one or more exceptions, allowing, with the productivity service, the new event to be scheduled on the electronic calendar of the user; and
   creating, with the productivity service, the new event on the electronic calendar of the user.

2. The method of claim 1, further comprising, in response to the category of the new event not matching the category of the categorized time block, rejecting, with the productivity service, the new event.

3. The method of claim 1, further comprising:
   inferring, with the productivity service, a category of the categorized time block based on one or more of a current schedule of the user, a scheduling history of the user, and a user behavior in conjunction with the electronic calendar of the user.

4. The method of claim 1, further comprising:
   inferring, with the productivity service, a category of the categorized time block based on a communication associated with the user, or
   determining, with the productivity service, a category of the categorized time block based on a direct input from the user.

5. The method of claim 1, wherein determining whether the specified time of the new event falls within a categorized time block includes determining a beginning and an end of the categorized time block based on a direct input from the user or an inference.

6. The method of claim 1, wherein the one or more exceptions are based on a category of the new event, a person requesting or associated with the new event, or percentage based double booking.

7. The method of claim 1, wherein the one or more exceptions are customizable and configurable by the user.

8. The method of claim 1, wherein the one or more exceptions are based on inference by analyzing one or more of a current schedule of the user, a scheduling history of the user, and a user behavior in conjunction with the electronic calendar of the user.

9. The method of claim 1, further comprising:
   exposing, with the productivity service, the categorized time block to other users as busy time or with an indication of a category of the categorized time block.

10. The computer-implemented method of claim 1, wherein:
    the new event to be scheduled is received by the productivity service from a computing device of the user via a communication network link; and
    creating the new event on the electronic calendar further comprises providing an indication of the created event on the electronic calendar of the user to the computing device of the user.

11. A computing device controlling scheduling of events within an electronic calendar of a user, the computing device comprising:
    a communication interface configured to facilitate communication between the computing device and one or more other computing devices over the communication network link;
    a memory configured to store a calendar application; and
    one or more processors coupled to the memory and the communication interface, the one or more processors configured, via execution of the calendar application, to:
      receive a new event to be scheduled on the electronic calendar of the user at a specified time;
      determine whether the specified time of the new event falls within a categorized time block indicative of a period of time subject to one or more restriction requirements preventing scheduling of events on the electronic calendar of the user;
      determine a category of the new event;
      compare the category of the new event to a category of the categorized time block;
      in response to the category of the new event matching the category of the categorized time block, determine that the new event is subject to one or more exceptions to one or more restriction requirements associated with the categorized time block;
      in response to a determination that the new event is subject to the one or more exceptions, allow the new event to be scheduled on the electronic calendar of the user; and
      create the new event on the electronic calendar of the user.

12. The computing device of claim 11, wherein the one or more processors are further configured to in response to the category of the new event not matching the category of the categorized time block, reject the new event.

13. The computing device of claim 11, wherein the one or more processors are further configured to determine the one or more exceptions to the one or more restriction requirements associated with the categorized time block based on direct user input or an inference.

14. The computing device of claim 13, wherein the one or more processors are further configured to determine the one or more exceptions to the one or more restriction requirements associated with the categorized time block based on inference by analyzing one or more of a current schedule of the user, a scheduling history of the user, and a user behavior in conjunction with the electronic calendar of the user.

15. The computing device of claim 11, wherein the one or more processors are further configured to determine a category of the time block based on inference based on a type of one or more existing events on the electronic calendar of the user and/or a direct input from the user.

16. A non-transitory computer-readable memory device with instructions stored thereon, which when executed by a computing device cause the computing device to control scheduling of events within an electronic calendar of a user, the instructions comprising:
    receive a new event to be scheduled on the electronic calendar of the user at a specified time;
    determine whether the specified time of the new event falls within a categorized time block indicative of a period of time subject to one or more restriction requirements preventing scheduling of events on the electronic calendar of the user;
    determine a category of the new event;
    compare the category of the new event to a category of the time block;
    in response to the category of the new event matching the category of the categorized time block, determine that the new event is subject to one or more exceptions to one or more restrictions requirements associated with the categorized time block;
    in response to a determination that the new event is subject to the one or more exceptions, allow the new event to be scheduled on the electronic calendar of the user; and
    create the new event on the electronic calendar of the user.

17. The computing device of claim 11, wherein:
    the new event to be scheduled is received by the productivity service from a computing device of the user via a communication network link; and
    creating the new event on the electronic calendar further comprises providing an indication of the created event on the electronic calendar of the user to the computing device of the user.

18. The non-transitory computer-readable memory device of claim 16, wherein the instructions when executed by the one or more processors further cause the computing device to:
    in response to the category of the new event not matching the category of the categorized time block, reject the new event.

19. The non-transitory computer-readable memory device of claim 16, wherein the instructions when executed by the one or more processors further cause the computing device to:
    determine the one or more exceptions to the one or more restriction requirements associated with the categorized time block based on direct user input or an inference.

20. The non-transitory computer-readable memory device of claim 16, wherein:
    the new event to be scheduled is received by the productivity service from a computing device of the user via a communication network link; and
    creating the new event on the electronic calendar further comprises providing an indication of the created event on the electronic calendar of the user to the computing device of the user.

* * * * *